United States Patent
Raposa (10) Patent No.: US 12,439,891 B2
(45) Date of Patent: Oct. 14, 2025

(54) DOG COLLAR LEASH ATTACHMENT

(71) Applicant: Rick Raposa, Visalia, CA (US)

(72) Inventor: Rick Raposa, Visalia, CA (US)

( * ) Notice: Subject to any disclaimer, the term of this patent is extended or adjusted under 35 U.S.C. 154(b) by 0 days.

(21) Appl. No.: 18/827,260

(22) Filed: Sep. 6, 2024

(65) Prior Publication Data

US 2025/0000062 A1 Jan. 2, 2025

Related U.S. Application Data

(63) Continuation of application No. 18/126,357, filed on Mar. 24, 2023, now Pat. No. 12,082,557.

(51) Int. Cl.
*A01K 27/00* (2006.01)

(52) U.S. Cl.
CPC .......... *A01K 27/004* (2013.01); *A01K 27/001* (2013.01)

(58) Field of Classification Search
CPC ..................................... A01K 27/001–27/005
USPC ................................ 119/792, 795, 797, 798
See application file for complete search history.

(56) References Cited

U.S. PATENT DOCUMENTS

| | | | |
|---|---|---|---|
| 4,328,767 A | 5/1982 | Peterson | |
| 5,441,017 A | 8/1995 | Lindsay | |
| 5,890,637 A | 4/1999 | Furneaux | |
| 6,016,772 A | 1/2000 | Noyes | |
| 6,016,792 A | 1/2000 | Kawano et al. | |
| 6,481,382 B2 | 11/2002 | Cohn | |
| 6,581,547 B1 | 6/2003 | Austin | |
| 6,732,834 B2 | 5/2004 | Colorado | |
| 7,168,394 B2 | 1/2007 | Berry | |
| 7,610,880 B2 | 11/2009 | Lord | |
| D648,905 S | 11/2011 | Maurer | |
| D662,266 S | 6/2012 | Dold | |
| D685,144 S | 6/2013 | Etheredge | |
| 8,474,414 B2 * | 7/2013 | Dagnon | A01K 27/001 119/856 |
| 2019/0208748 A1 | 7/2019 | Young | |

FOREIGN PATENT DOCUMENTS

WO 2006116585 A2 2/2006

OTHER PUBLICATIONS

Co-Leash, "Dog Collar and Leash Combined", Web archive from 2022, Obtained on Oct. 10, 2023, Available Online: https://web.archive.org/web/20220125111127/http://coleash.com/shop/co-leash-dog-collar-and-leash-combined/.

(Continued)

*Primary Examiner* — Richard T Price, Jr.
(74) *Attorney, Agent, or Firm* — Sierra IP Law, PC; Mark D. Miller (57) ABSTRACT

A dog collar with detachable and retractable leash attachment. The leash attachment includes a leash in the form of an elastomeric cord is provided inside a sleeve that may be temporarily engaged around the dog collar. One end of the leash pivotally attached to the collar using a clip, and a handle is provided at the other end. Grasping and pulling the handle releases the sleeve from the collar and stretches the elastomeric cord, providing a short leash for a pet owner to control and direct a dog over short distances. The leash attachment may include an engagement surface that is operable to temporarily attach to a complementary surface on the exterior of the collar.

13 Claims, 9 Drawing Sheets

(56) References Cited

OTHER PUBLICATIONS

Co-Leash, "Kryptaglow Dog Collar and Leash Combined", Web archived from 2021, Obtained on Oct. 10, 2023, Available Online: https://web.archive.org/web/20220125100656/http://coleash.com/shop/co-leash-kryptaglow-dog-collar-and-leash-combined/.

Co-Leash, "Welcome to the Home of the Co-Leash Dog Collar!", Web archive from 2021, Obtained on Oct. 10, 2023, Available Online: https://web.archive.org/web/20211222112445/http://coleash.com/.

Co-Leash, "Nite Lite Collar and Leash Combined", Web archive from 2022, Obtained on Oct. 10, 2023, Available Online: http://coleash.com/shop/co-leash-nite-lite-collar-and-leash-combined/.

Co-Leash, Product Category, Web archive from 2021, Obtained on Oct. 10, 2023, Available Online: https://web.archive.org/web/20211224123652/http://coleash.com/product-category/co-leash/.

Co-Leash, "Quick Release by Co-Leash", Web archive from 2022, Obtained on Oct. 10, 2023, Available Online: https://web.archive.org/web/20220125114746/http://coleash.com/shop/quick-release-by-co-leash/.

Co-Leash, Shop, Web archive from 2021, Obtained on Oct. 10, 2023, Online: https://web.archive.org/web/20211226015758/http://coleash.com/shop/.

\* cited by examiner

DOG COLLAR LEASH ATTACHMENT

FIELD OF THE INVENTION

The present invention relates generally to dog collar leashes. More particularly, the present invention provides leash attachments that are operable to engage around the surface of a dog collar and may include a sleeve having an elastomeric cord that is operable to extend and retract to provide a pet owner with a temporary leash for controlling and directing a dog for a short period of time.

BACKGROUND OF THE INVENTION

An ordinary dog collar includes a piece of material, typically made of leather, nylon, or neoprene, that fits around a dog's neck and is used to attach a leash, identification tags, or other accessories. A dog collar typically has a buckle, D-ring, or quick-release mechanism for easy fastening and adjustment. Some dog collars may also have additional features such as reflective material for visibility, or built-in GPS tracking devices. The size, material, and design of a dog collar will vary depending on the intended use and the size and breed of the dog.

An ordinary dog leash is usually a rope, cord, or strap that may be attached to a dog collar and used to control or guide the dog while walking, running, or playing. Retractable leashes are a common type of leash that can be extended or contracted with the press of a button, allowing the dog to move freely while still being controlled. Such dog leashes include a bulky spring-loaded mechanism to release or reel in the leash. Dog leashes are an essential tool for pet owners, as they allow an owner to keep their dog safe and under control and prevent it from running away or getting into dangerous situations.

Many dog parks include leash-free areas where dogs are allowed to roam freely. However, when it is time to go, the dog owner may realize that they have forgotten to bring the leash, or that the leash is far away in the car that is parked blocks away down the street. A lengthy or spring-loaded leash is not needed for such short durations (e.g., to travel from the dog park to the car). It would therefore be beneficial to provide a leash having a low profile that may be wrapped around a dog collar when not in use, and unwrapped for use over short periods of time to travel short distances (e.g., from the dog park to the car). It would also be beneficial if such a leash had a low profile to avoid unnecessary entanglements, and it the leash were easily fully detachable from the collar sot that it may be replaced by the longer or spring-loaded leash for normal day-to-day walks and activity. There is therefore a need for a dog collar that includes a short-range leash that is immediately available on the collar, but also easily removable therefrom, low profile, and substantially hidden when not in use.

SUMMARY OF THE INVENTION

The present invention provides a dog collar that is operable to receive a low-profile retractable leash attachment device or other animal restraining system. The low-profile leash attachment may have a hidden retractable leash that is operable to extend in length and provide owners with maneuverability to control or guide their dog over short distances or in emergencies.

Accordingly, the present invention provides an adjustable-length dog collar that includes a collar that is operable to receive a leash attachment. The collar may have an exterior surface with an engagement region that is operable to secure a sleeve of the low-profile leash attachment temporarily. The collar may include a plurality of through holes, a dog collar buckle, a D-ring, and a free end, and may be adjustable. The low-profile leash attachment may include an engagement surface, a clip such as a bolt snap or snap hook or swivel snap, and a sleeve with a channel operable to hide an elastomeric cord with a handle or clutching region that provides a surface for owners to control and direct their dogs.

In some embodiments, the collar may be manufactured from a variety of materials, including nylon, leather, neoprene, polyester, canvas, webbing, and cotton, and are available in different lengths, widths, and styles to meet the specific needs of different dogs and their owners. In some embodiments, the dog collar belt buckle may include a frame attached to the dog collar on one end and a prong used to secure the free end of the collar. The frame may have a flat back and a curved front, or it may be shaped like a traditional belt buckle with a rectangular or oval shape. The prong may be a metal rod or bar that can be inserted into the frame to hold the collar in place.

In some embodiments, the leash attachment may include a sleeve, an elastomeric cord within the sleeve, and a snap hook fastener secured to a base of the sleeve or cord for quick and easy attachment and detachment from the collar. The snap hook may be made from a variety of materials, including stainless steel, aluminum, and plastic, and are available in different sizes and styles to meet the specific needs of the collar. In some embodiments, the snap hook may be a snap hook have a spring-loaded mechanism that keeps the hook securely closed until it is pulled open and may include a rotating connection that allows the hook to rotate freely, reducing tangles and snags. The snap hook may be positioned around the D-ring of the collar.

In some embodiments, the leash attachment may include a sleeve manufactured from nylon, leather, neoprene, polyester, canvas, webbing, and cotton. The sleeve may provide a channel housing an elastomeric cord (e.g., bungee cord, etc.). The elastomeric cord may be permanently attached to the base of the channel by sewing the cord directly to the sleeve material, by using adhesives, self-adhesive looping, or other suitable means. In some embodiments, the base of the channel may be attached to the snap hook; in other embodiments, one end of the cord itself may be attached to the snap hook. The elastomeric cord may be constructed from rubber or synthetic polymers that are operable to stretch and return to their original shape, such as, for example and without limitation, natural rubber, synthetic rubber, polypropylene, nylon, polyester, thermoplastic elastomers, and elastodiene, and may be surrounded by a durable outer layer, which can be made from materials such as without I imitation polypropylene, nylon, or similar material, to protect the elastic from abrasion and damage. In such embodiments, the elastomeric cord is usually retracted and held under tension, allowing it to stretch when it is applied and then return to its original shape when it is released.

In some embodiments, an engagement region of the collar and an engagement surface of the leash sleeve may be complementary. In such embodiments, the collar region and sleeve surface may have complementary strips of hook and loop fasteners, for example, a strip of small loops may be sown to the exterior surface of the collar (providing a softer exterior when the leash attachment is not present), and a strip of small hooks may be sown to the interior surface of the leash attachment sleeve. The hooks and loops of the two strips may interlock when pressed together, allowing the two strips to be joined and separated easily. In some embodiments, the complementary surfaces may have reusable adhesive layers that provide a temporary bond between the collar and leash attachment.

One aspect of the present invention includes a pet collar with a detachable retraction leash, which may comprise: an adjustable collar having an inner surface, an outer surface having an engagement region, a D-ring, and a buckle operable to temporarily secure the collar around a neck of an animal such as a dog; a sleeve having an internal channel with a closed end, and an open end, the sleeve having a surface with an engagement region that is complementary to that of the outer surface of the collar; an elastomeric cord disposed within the internal channel of said sleeve, the cord having a first end attached at said closed end of said sleeve, and said cord having an opposite end extending through said open end of said sleeve; and an attachment interface operable to attach the closed end of the sleeve to the D-ring; wherein the inner surface engagement structure of the sleeve may be operable to temporarily attach the sleeve to the engagement region on the outer surface of the collar and may easily detachable from the collar when a user engages the clutching portion and of the elastomeric cord. The adjustable collar engagement region may be complementary to the engagement surface of the sleeve and provides a low profile around the collar. The engagement surface of the sleeve may be a strip of hooks and the engagement region may be a strip of loops that are operable to interlock together when pressed together. The adjustable collar buckle may be a smart collar buckle, a clip-on buckle, or a metal buckle having a frame and prong. The attachment interface may include a snap hook having a fixed end secured to the sleeve closed end and a loop securing around the dog collar eyelet. The sleeve may be removable from the dog collar by engaging the attachment member with the dog collar eyelet. The elastomeric cord may have a relaxed length complementary to the length of the interior channel in the sleeve and may be operable to stretch to an extended length when under tension and returns to the original relaxed shape when tension is released. The clutching portion may have an eyelet geometry that allows users to hook a finger in the eyelet to provide tension to the elastomeric cord. The clutching portion may have a spherical geometry operable to allow users to grab the clutching portion. The clutching portion may extend out of the sleeve for easy access to the use.

In another aspect of the present invention, a low-profile leash attachment for a dog collar may be provided that includes: an adjustable collar provided with an engagement region around the exterior surface, a D-ring adjacent to the engagement region, and a buckle, a sleeve having an engagement surface, a base end, and a channel for housing an elastomeric cord having one end that may be anchored to the base end and another free end with a clutching portion or handle extending out of the channel; and a snap hook operable to connect the sleeve to the adjustable collar; wherein the snap hook has a fixed end secured to the sleeve base end for snap engagement with the D-ring of the adjustable collar; wherein the adjustable collar may secure around a neck of a dog and the sleeve may attachable to the collar using the snap hook, and the sleeve engagement surface may operable to fasten the sleeve to the engagement region of the collar, thereby aligning the sleeve with the adjustable collar. The clutching portion may be engaged by a user, the sleeve engagement surface may detach from the collar engagement region, and the sleeve may swivel freely around the collar D-ring and hooking loop interface. The elastomeric cord may be nested in the channel and has a relaxed length complementary to the length of the channel and may be operable to stretch to an extended length when under tension and return to the original length when released. The clutching portion may have an eyelet geometry or a spherical geometry operable to provide users with a handle. The extended length of the elastomeric cord may double in length from the original position.

It is a further aspect of the present invention to provide a method for securing a low-profile leash attachment to a dog collar, which may include: providing a sleeve with an engagement surface, a base end securing a snap hook, and a channel housing an elastomeric cord that may anchor to the base end and has a free end with a clutching portion extending out of the channel; attaching the snap hook to a D-ring of an adjustable collar provided with an engagement region around the exterior surface, and aligning the sleeve engagement surface with the engagement region of the adjustable collar, the adjustable collar may secure around a dog's neck, and the sleeve may be mated to the exterior surface of the collar. The method may further include tugging on the clutching portion of the elastomeric cord and detaching the sleeve from the exterior surface of the adjustable collar, pulling on the clutching portion and providing tension to the elastomeric cord, and extending the length of the cord for a user to comfortably use the sleeve and elastomeric cord as a temporary leash that may operable to swivel around the D-ring about the snap hook, releasing the tension from the elastomeric cord, positioning the sleeve engagement surface with the collar engagement region, and interlocking the two surfaces. The engagement surface of the sleeve may include a strip of hooks, and the collar engagement region may be a strip of loops that are operable to interlock together when pressed and mate the sleeve to the collar.

Further aspects and embodiments will be apparent to those having skill in the art from the description and disclosure provided herein.

It is an object of the present invention to provide a dog collar having an easily attachable leash that is provided inside a sleeve that may be temporarily engaged around the collar, the sleeve including a retractable cord inside the sleeve with one end of the cord attached to the collar and an opposite end attached to a handle for a user to grip for directing and controlling the dog.

It is another object of the present invention to provide a dog collar and a attachable leash that is provided inside a sleeve that may be temporarily engaged around the collar using a surface of hooks on the sleeve and a surface of intergrading loops on the collar.

It is another object of the present invention to provide methods of supplying a short leash that may be temporarily attached to a dog to be used as a backup in situations where an ordinary leash is not available.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

Referring to the drawings, wherein like reference characters designate like or corresponding parts throughout the several views, and referring particularly to FIGS. 1-13, it is seen that the present invention includes various embodiments of a dog collar incorporating a low-profile retractable leash attachment, the leash attachment having a sleeve operable to enclose a retractable cord providing a short leash, the attachment being detachable, removable, and replaceable.

Figure 1:
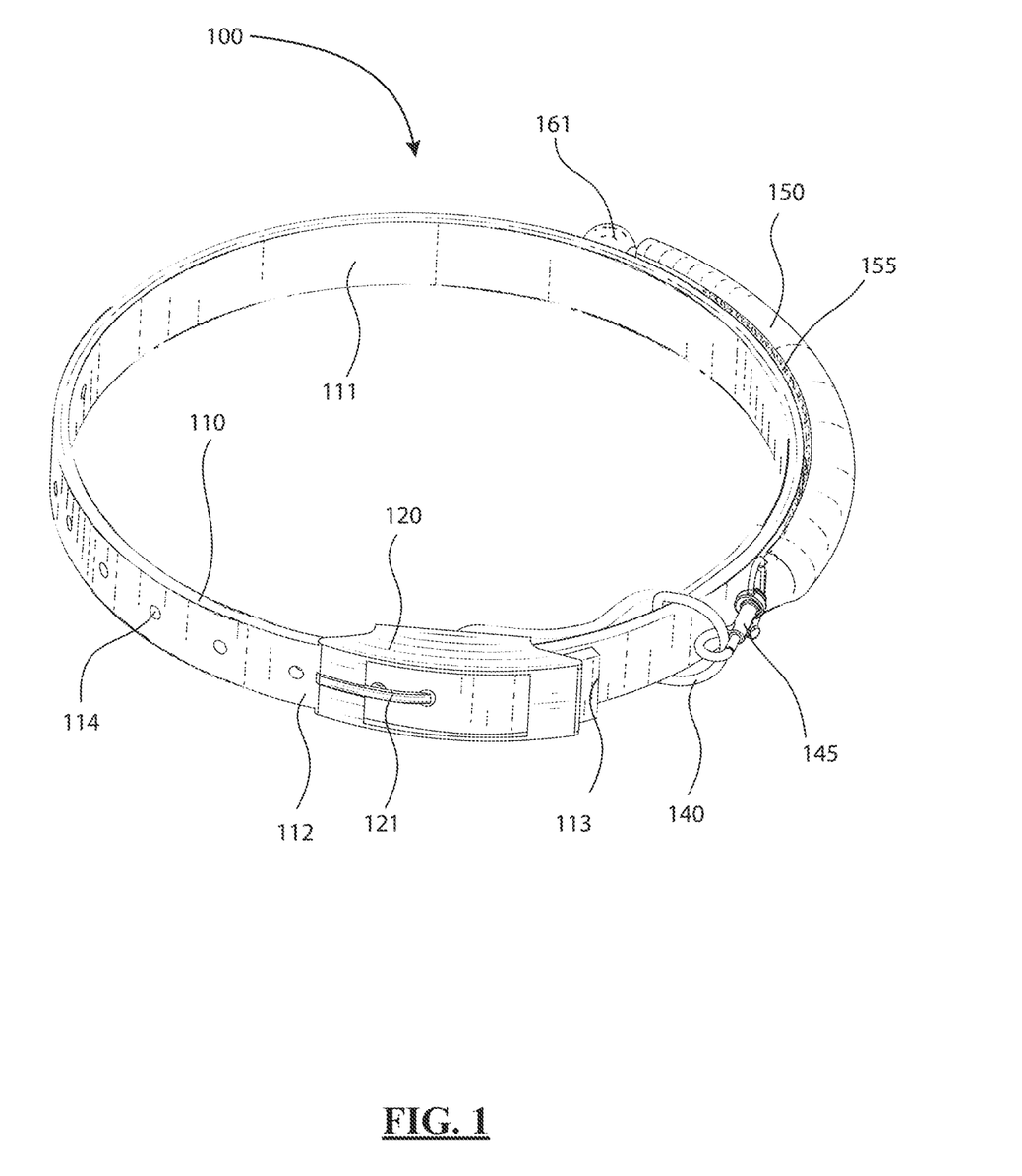
FIG. 1 shows a perspective view of a dog collar and leash, according to an embodiment of the present invention.
Figure 2:
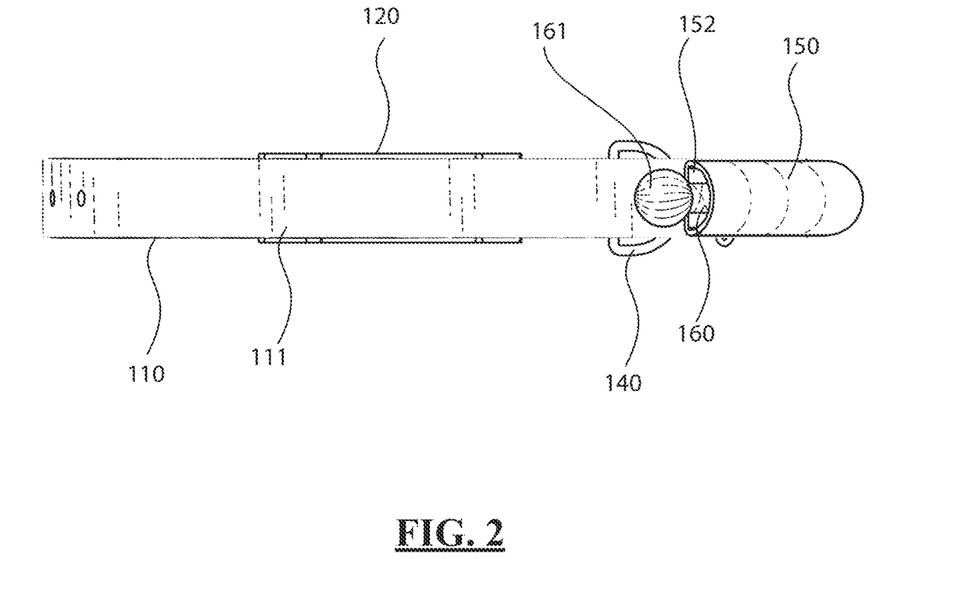
FIG. 2 shows an anterior view of a dog collar and leash, according to an embodiment of the present invention.
Figure 3:
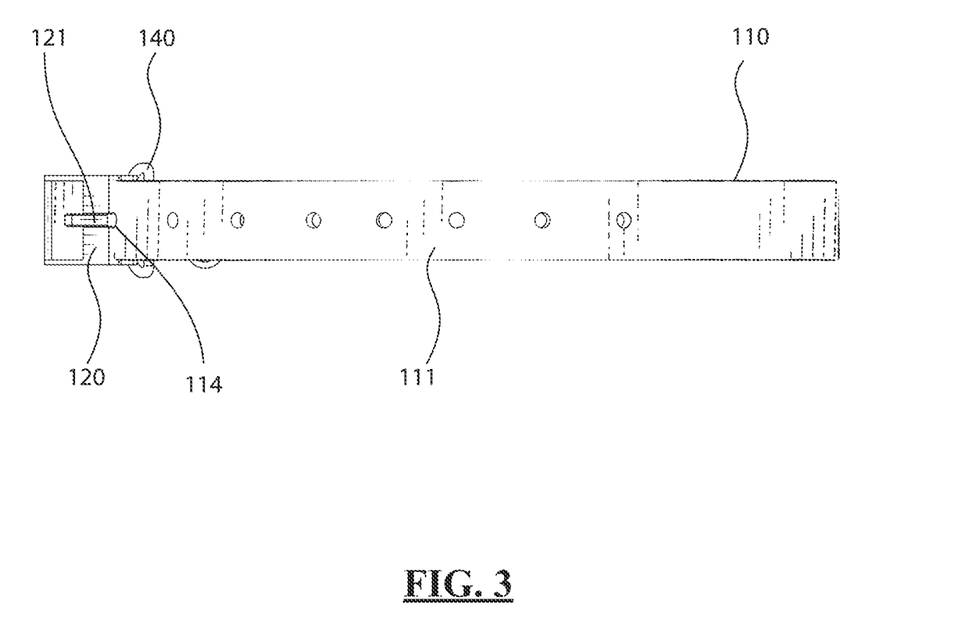
FIG. 3 shows a posterior view of a dog collar and leash, according to an embodiment of the present invention.
Figure 4:
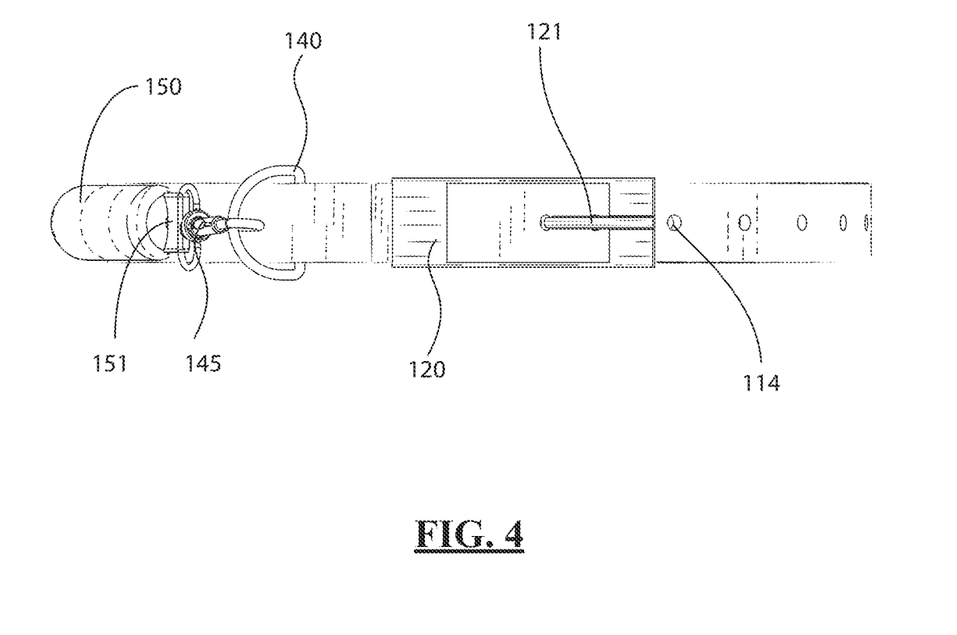
FIG. 4 shows a first side view of a dog collar and leash, according to an embodiment of the present invention.
Figure 5:
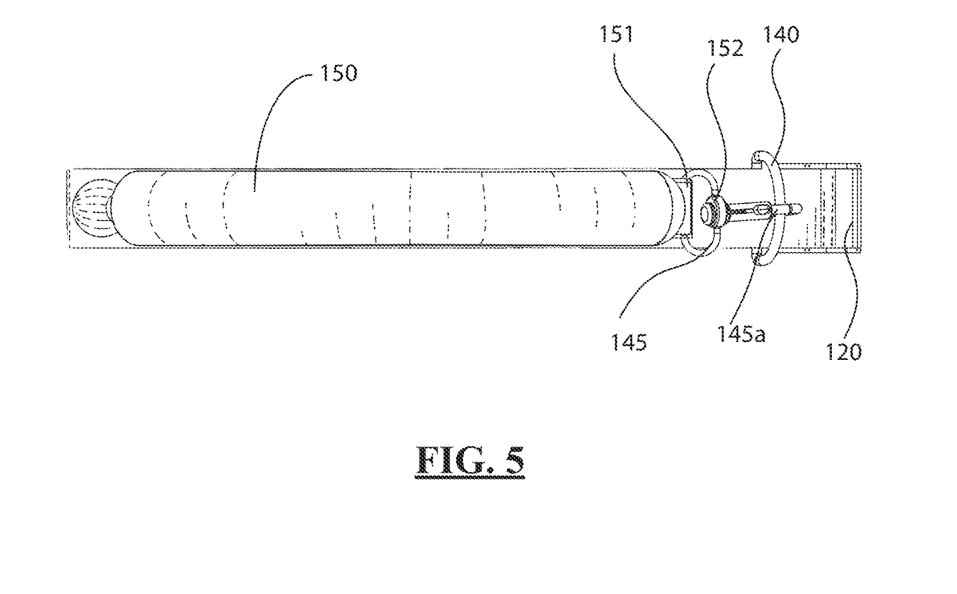
FIG. 5 shows a second side view of a dog collar and leash, according to an embodiment of the present invention.
Figure 6:
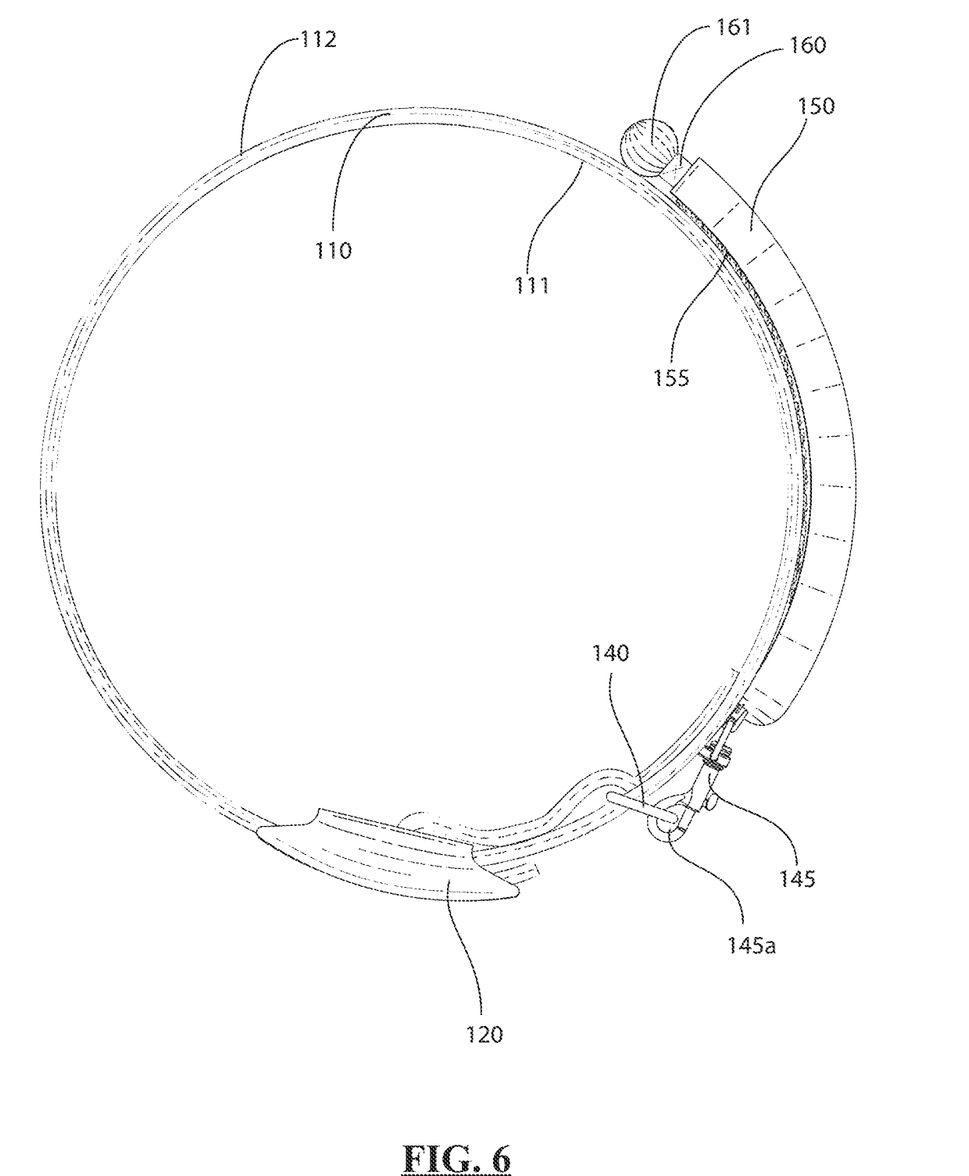
FIG. 6 shows a top view of a dog collar and leash, according to an embodiment of the present invention.
Figure 7:
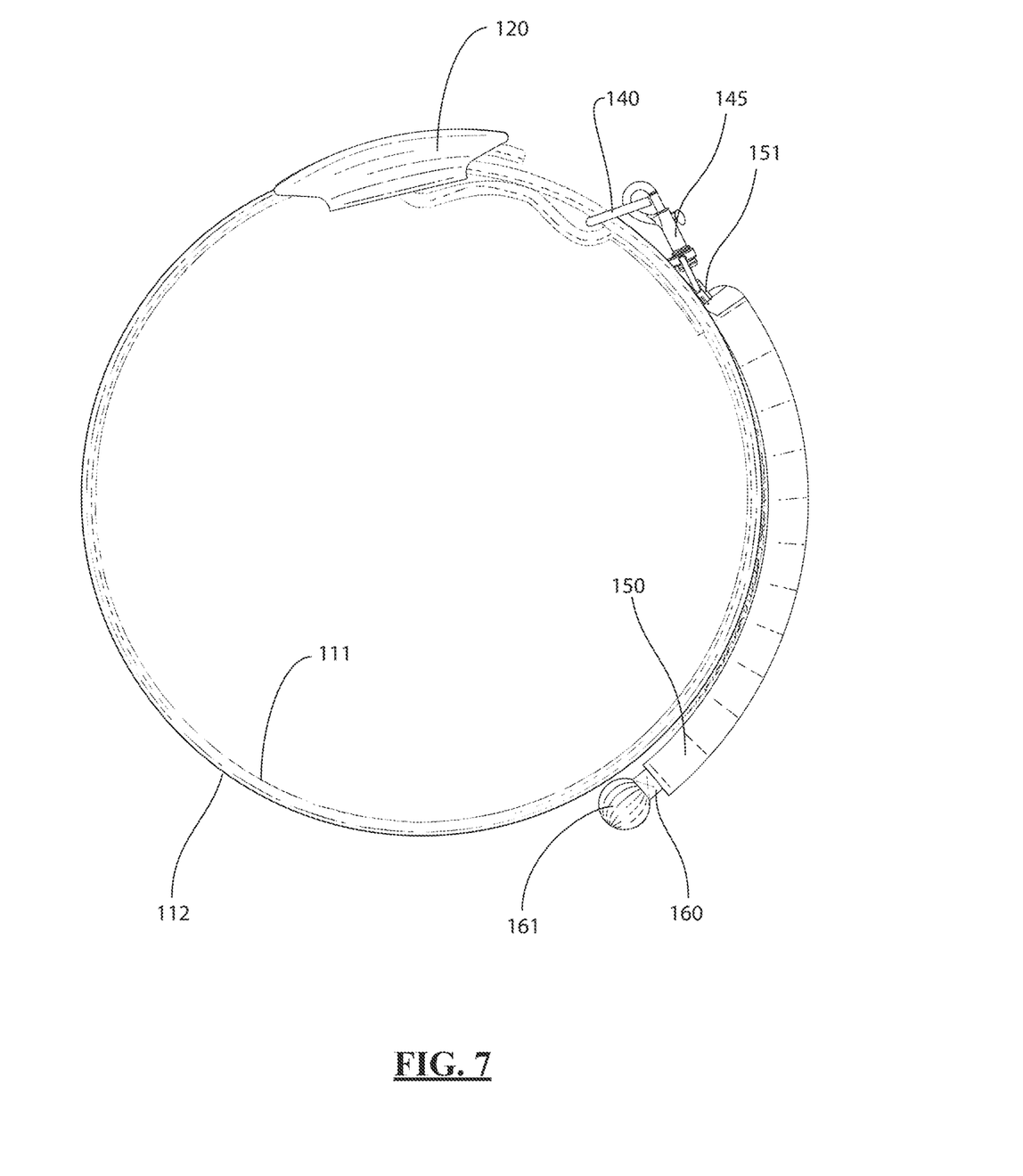
FIG. 7 shows a bottom view of a dog collar and leash, according to an embodiment of the present invention.
Figure 8:
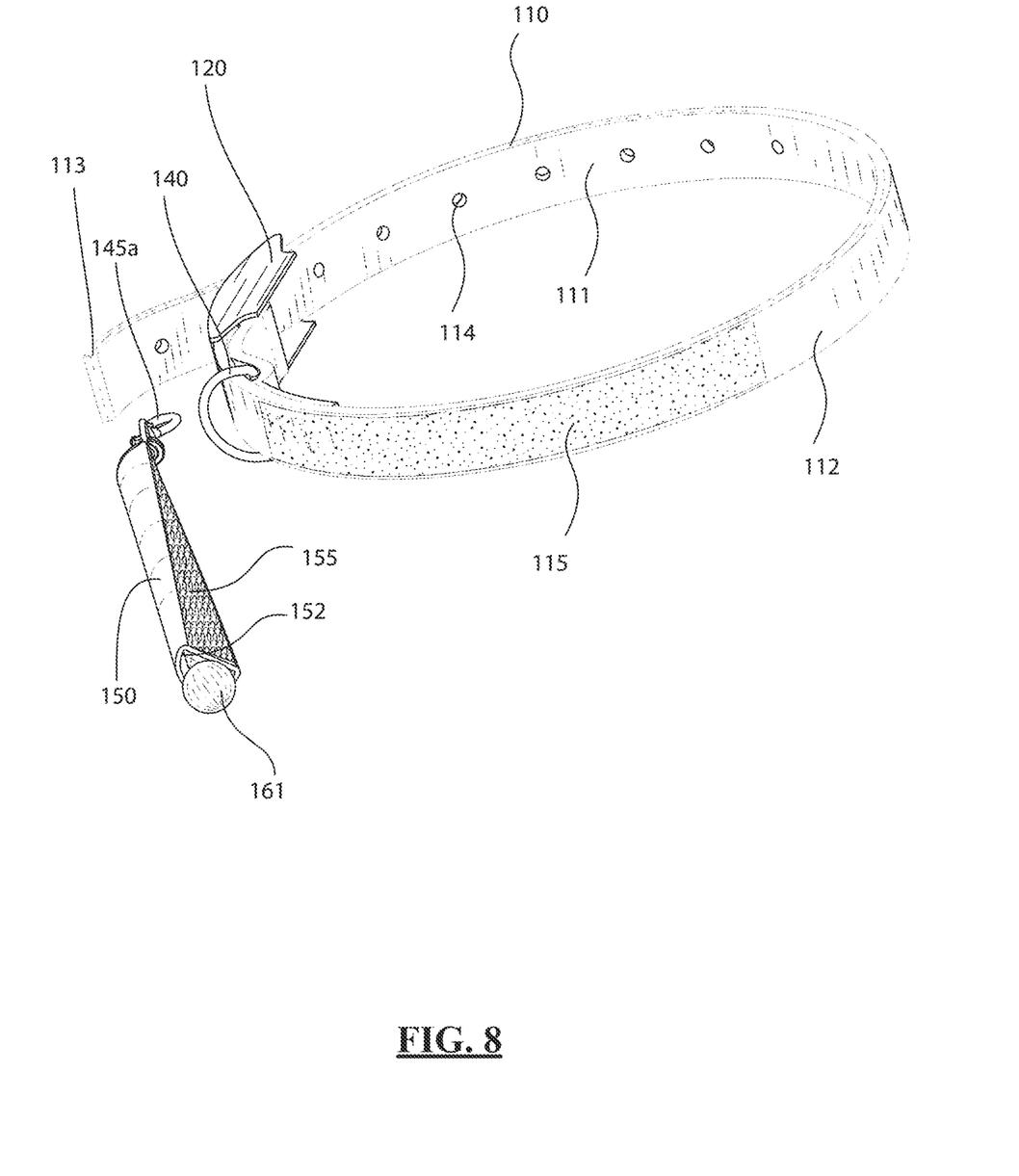
FIG. 8 shows a perspective view of a dog collar and leash of an embodiment of the present invention that have been separated from each other.

Embodiments of the present invention provide a combination of a dog collar and low-profile retractable leash provided inside a sleeve in which the sleeve containing the leash may be engaged around a portion of the outside surface of the dog collar. FIGS. 1-9 provide views of an exemplary dog collar with leash attachment 100, according to the present invention. As best shown in FIG. 8, the collar 110 may include an interior surface 111, an exterior surface 112, a free end 113, a plurality of through holes 114, a ring 140, and an engagement region 115 on the exterior surface 112. It is to be appreciated that although ring 140 is illustrated as a D-ring, any suitable ring structure may be used. The circumference of the collar 110 may be adjustable, and the desired collar length may be secured with a buckle 120 that includes a prong 121 operable to engage with the through hole 114 of the collar. Illustrations of an adjusted collar are shown in FIGS. 1-7.

Figure 10:
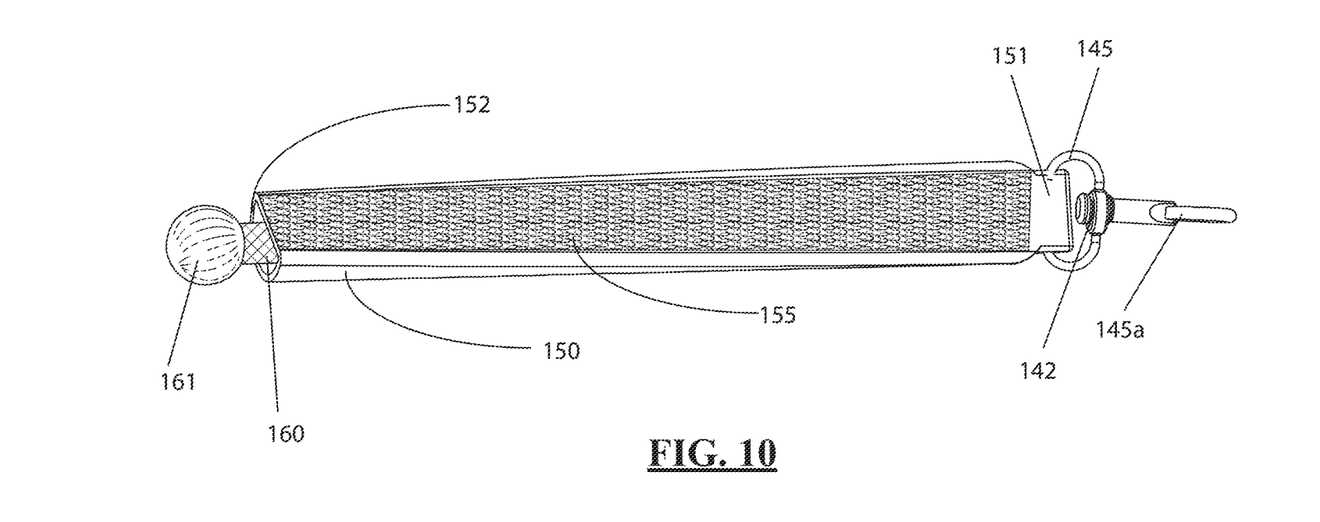
FIG. 10 shows a bottom view of a leash attachment of an embodiment of the present invention in a contracted condition.
Figure 11:
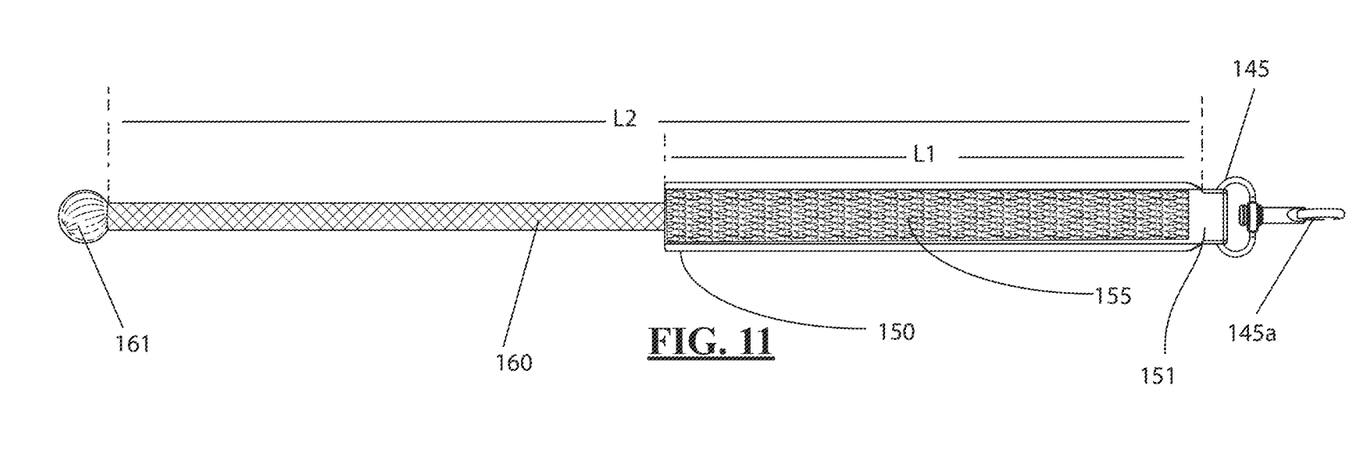
FIG. 11 shows a bottom view of a leash attachment of an embodiment of the present invention in an extended condition.

Referring to FIGS. 10-11, the illustrated embodiment of the present invention provides a leash attachment that may include a sleeve 150 having an internal channel that is operable to house an elastomeric cord 160. A fixed end of cord 160 may be attached to the base of the sleeve 151 inside the channel (not shown), and a clip 145 such as without limitation a bolt snap or snap hook or swivel snap may be attached to the exterior of base 151 of the sleeve 150. In alternative embodiments, the fixed end of cord 160 may be extend through base 151 of sleeve 150 and be attached directly to clip 145. The sleeve 150 may include an exterior engagement surface 155 that is complementary to an engagement region 115 on the exterior surface 112 of collar 110, and is operable to secure the sleeve 150 to the collar 110, when the two surfaces a pressed together.

Figure 12:
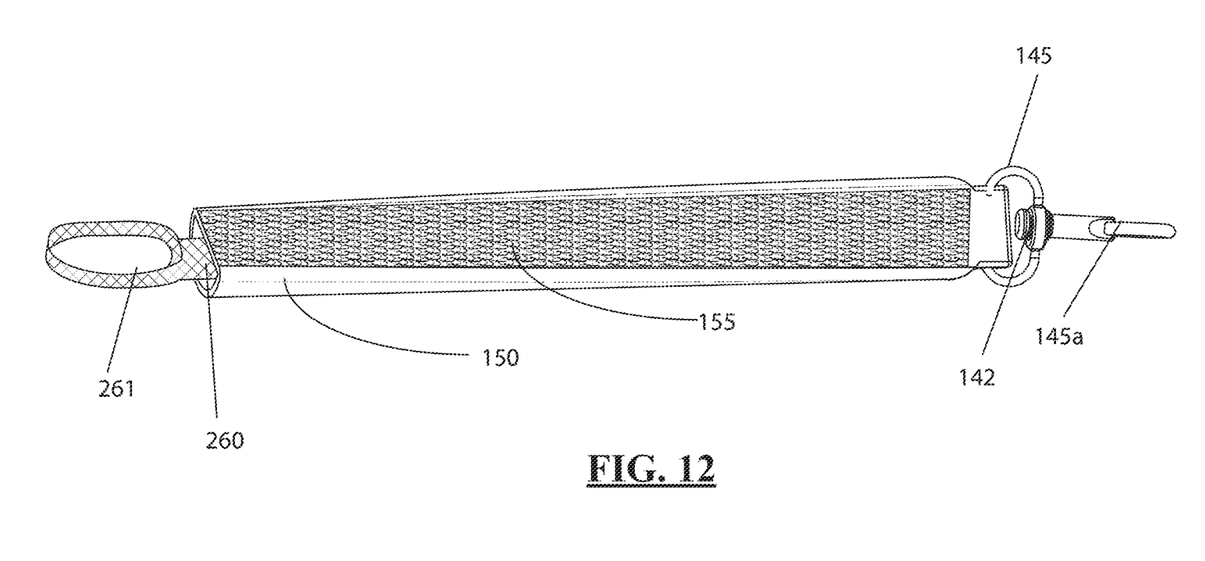
FIG. 12 shows a bottom view of a leash attachment of an alternative embodiment of the present invention in a contracted condition.
Figure 13:
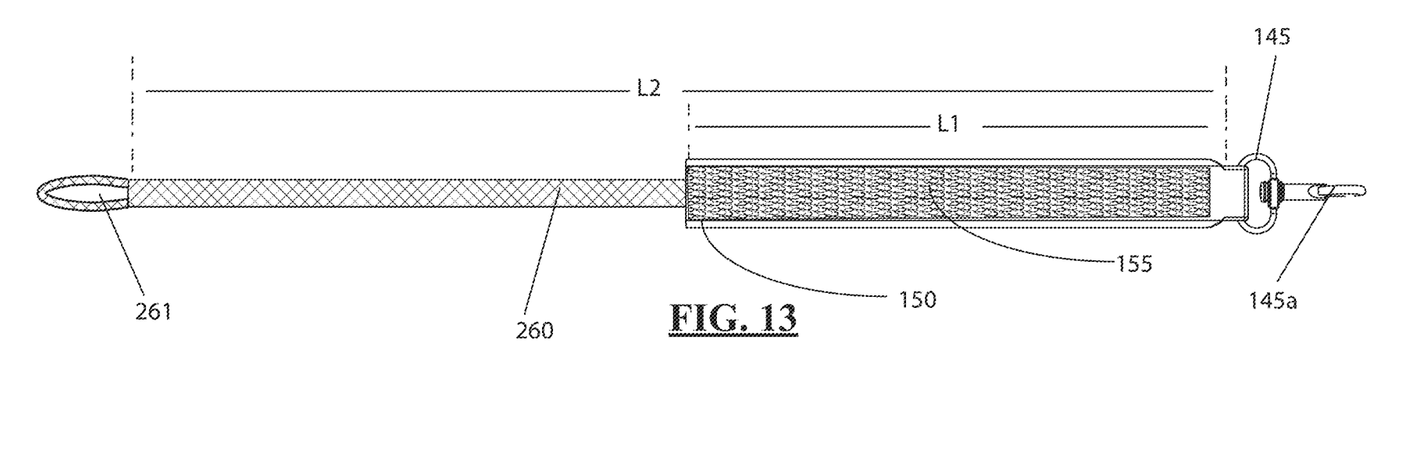
FIG. 13 shows a bottom view of a leash attachment of an alternative embodiment of the present invention in an extended condition.

In some embodiments, the clip 145 may include a loop 245a that is operable to secure around a D-ring 140 of the collar and may have a swivel joint 242 between the loop 245a and the bolt snap or snap hook or swivel snap mount. The elastomeric cord 160 may provide a handle 161 that is attached to the free end of the elastomeric cord 160 which protrudes from the sleeve channel opening 152 when in the relaxed configuration as shown in FIG. 10. When attached to a collar the handle 161 may be grasped and the elastomeric cord 160 may be extended to the extended length L2 from the relaxed length L1, as shown in FIG. 11. In some embodiments, as illustrated in FIGS. 12-13, the leash attachment may have an elastomeric cord 260 provided with a loop or eyelet clutching region 261 that is operable to allow a user to hook their fingers when extending the elastomeric cord 260 to the extended length L2.

In some embodiments, the length L1 of cord 160 may range from about 10 to about 18 inches in a relaxed configuration, and the length L2 of cord 160 may be stretched anywhere from about 20 inches to about 29 inches in an extended configuration. The elastomeric cord 160 may have an extended length L2 that is dependent on the original length L1, the stretch ratio of the cord corresponds to elasticity or Young's modulus of the material used to construct the cord. In such embodiments, it may be ideal for the elastomeric cord 160 to be hidden within the sleeve channel 150 and only exposing the clutching region 161 to prevent unwanted snagging and injury to the animal.

As shown in the semi-exploded view of FIG. 8 the leash attachment sleeve 150 may be removed from the collar 110. The clip 145 may have a hook loop 145a that can be opened and closed to remove or secure the bolt snap or snap hook or swivel snap 145 to the D-ring 140 of the collar. When clip 145 is attached to the D-ring 140, the engagement surface 155 of the sleeve 150 may be aligned with the engagement region 115 of the collar 110, and the sleeve 150 may circumferentially mate along the exterior surface 112 of the collar 110 as illustrated in FIGS. 1-7. In order to use a leash attached in this way, a user need simply grasp the handle 161 or loop 162 and pull; this will cause the sleeve 150 to detach from the collar 110, and will cause cord 160 to extend out from sleeve 150. This provides the user with a short leash with which to control the dog or other animal until a longer leash may be obtained.

Figure 9:
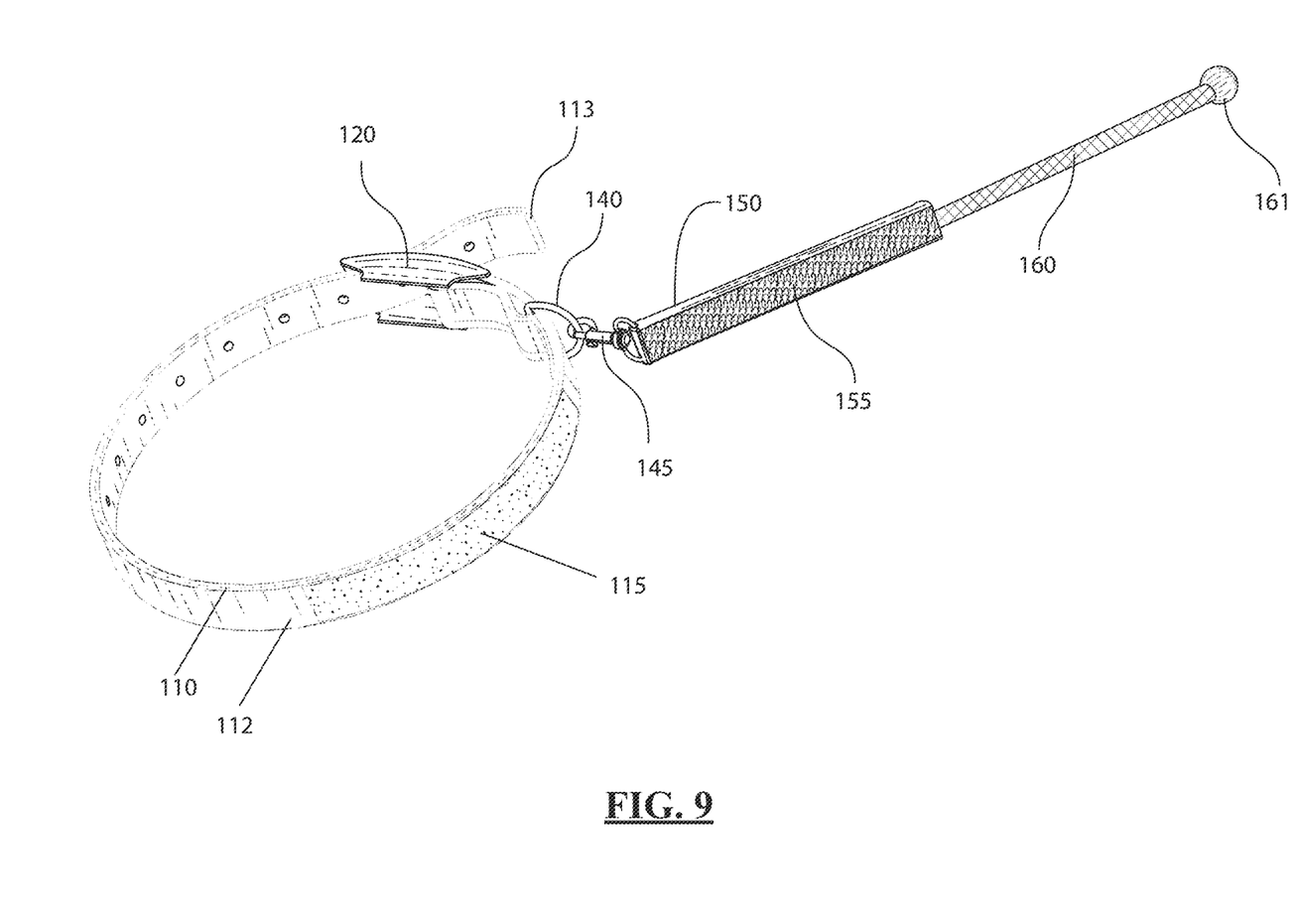
FIG. 9 shows an elevated perspective view of a dog collar and leash of an embodiment of the present invention with the leash in an extended configuration.

FIG. 9 shows an environmental perspective view of the exemplary dog collar incorporating leash attachment 100 in an expanded configuration. In such instances, when the handle or clutching region 161 is grasped, the sleeve engagement surface 155 may rip from the collar engagement region 115, and the sleeve may pivot along the D-ring 140. The elastomeric cord 160 may stretch up to the length L2 providing a user with extra length for maneuverability around the D-ring 140 and snap hook loop 145 interfaces. When tension is released from the elastomeric cord 160, the cord may return to the relaxed configuration in the sleeve 150, and the sleeve engagement surface 155 may then be aligned and reattached to the engagement region 115 of the collar 110.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A combination pet collar and detachable leash comprising:
   a. an adjustable collar having an inner surface, an outer surface having a first engagement region thereon, and a buckle operable to temporarily secure the collar around a neck of an animal;
   b. a sleeve having a second engagement region on an exterior surface thereof that is complementary to and operable for temporary engagement with said first engagement region, said sleeve comprising an internal channel with a closed end and an opposite open end; and
   c. an elastomeric cord disposed within said internal channel, said cord having a first end secured to the closed end of said channel and an opposite end having a handle thereon.

2. The combination of claim 1, wherein said sleeve is flat in order to provide a low profile when engaged around the collar.

3. The combination of claim 1, wherein the engagement region of said sleeve comprises a plurality of interengaging of hooks and the engagement region of said collar comprises a plurality of interengaging loops that are operable to interlock together when pressed together.

4. The combination of claim 1, further comprising a ring on said collar and a clip attached to the closed end of said sleeve, said clip being operable for temporary engagement with said ring.

5. The combination of claim 1, wherein said elastomeric cord has a relaxed length complementary to a length of said interior channel in said sleeve and is operable to stretch to an extended length when under tension and operable to return to the relaxed length when tension is released.

6. The combination of claim 4, wherein said clip has an eyelet geometry operable to allow users to hook a finger in said eyelet to provide tension to said elastomeric cord.

7. The combination of claim 4, wherein said clip is selected from the group of a bolt snap, a snap hook and a swivel snap.

8. The combination of claim 1, wherein said handle has a spherical geometry operable to allow users to grasp a clutching portion thereof.

9. The combination of claim 1, wherein said handle extends out of said sleeve for easy access to said user.

10. A low-profile dog collar and leash attachment comprising:
    a. an adjustable collar having a first exterior engagement surface thereon and a buckle;
    b. a sleeve having a second exterior engagement surface thereon that is complementary to the first engagement surface of said collar and operable for engagement therewith, said sleeve having an interior channel therein having openings at opposite ends thereof; and
    c. an elastomeric cord disposed within said interior channel and extending through said openings, wherein one end of said cord is attached to a handle.

11. The combination of claim 10, wherein the engagement region of said sleeve comprises a plurality of interengaging of hooks and the engagement region of said collar comprises a plurality of interengaging loops that are operable to interlock together when pressed together.

12. The combination of claim 10, wherein said elastomeric cord has a relaxed length complementary to a length of said interior channel in said sleeve and is operable to stretch to an extended length when under tension and operable to return to the relaxed length when tension is released.

13. The device of claim 12, wherein said extended length is operable to double in length from the relaxed length.

* * * * *